(12) United States Patent
Abhishek Raja et al.

(10) Patent No.: US 10,503,660 B2
(45) Date of Patent: Dec. 10, 2019

(54) TECHNIQUE FOR DETERMINING ADDRESS TRANSLATION DATA TO BE STORED WITHIN AN ADDRESS TRANSLATION CACHE

(71) Applicant: Arm Limited, Cambridge (GB)

(72) Inventors: Abhishek Raja, Austin, TX (US); Michael Filippo, Driftwood, TX (US)

(73) Assignee: Arm Limited, Cambridge (GB)

( * ) Notice: Subject to any disclaimer, the term of this patent is extended or adjusted under 35 U.S.C. 154(b) by 50 days.

(21) Appl. No.: 15/848,397

(22) Filed: Dec. 20, 2017

(65) Prior Publication Data

US 2019/0188149 A1    Jun. 20, 2019

(51) Int. Cl.
*G06F 13/00* (2006.01)
*G06F 12/1036* (2016.01)
(Continued)

(52) U.S. Cl.
CPC ...... *G06F 12/1036* (2013.01); *G06F 12/0891* (2013.01); *G06F 12/109* (2013.01); *G06F 12/1063* (2013.01); *G06F 15/7839* (2013.01)

(58) Field of Classification Search
CPC ..................... G06F 12/0862; G06F 12/1036
See application file for complete search history.

(56) References Cited

U.S. PATENT DOCUMENTS 3,412,382 A * 11/1968 Couleur ............... G06F 12/109
711/208

8,543,792 B1 * 9/2013 Glasco ............... G06F 12/1009
711/207

(Continued)

OTHER PUBLICATIONS

U.S. Appl. No. 15/290,039, filed Oct. 11, 2016, Inventor: Abhishek Raja et al.

*Primary Examiner* — Sean D Rossiter
(74) *Attorney, Agent, or Firm* — Nixon & Vanderhye P.C.

(57) ABSTRACT

An apparatus and method are provided for determining address translation data to be stored within an address translation cache. The apparatus comprises an address translation cache having a plurality of entries, where each entry stores address translation data used when converting a virtual address into a corresponding physical address of a memory system. Control circuitry is used to perform an allocation process to determine the address translation data to be stored in each entry. Via an interface of the apparatus, access requests are received from a request source, where each access request identifies a virtual address. Prefetch circuitry is responsive to a contiguous access condition being detected from the access requests received by the interface, to retrieve one or more descriptors from a page table, where each descriptor is associated with a virtual page, in order to produce candidate coalesced address translation data relating to multiple contiguous virtual pages. At an appropriate point, the prefetch circuitry triggers the control circuitry to allocate, into a selected entry of the address translation cache, coalesced address translation data that is derived from the candidate coalesced address translation data. Such an approach has been found to provide a particularly efficient mechanism for creating coalesced address translation data for allocating into the address translation cache, without impacting the latency of the servicing of ongoing requests from the request source.

19 Claims, 10 Drawing Sheets

(51) Int. Cl.
    *G06F 12/1045*    (2016.01)
    *G06F 12/0891*    (2016.01)
    *G06F 15/78*      (2006.01)
    *G06F 12/109*     (2016.01)

(56) References Cited

U.S. PATENT DOCUMENTS

| | | | | |
|---|---|---|---|---|
| 8,601,223 B1* | 12/2013 | Yuan | ................... | G06F 12/1027 |
| | | | | 345/535 |
| 2009/0013149 A1* | 1/2009 | Uhlig | ................... | G06F 12/109 |
| | | | | 711/207 |
| 2011/0055456 A1* | 3/2011 | Yeh | ................... | G06F 12/0862 |
| | | | | 711/103 |
| 2014/0129814 A1* | 5/2014 | Bi | ................... | G06F 9/4406 |
| | | | | 713/1 |
| 2016/0147446 A1* | 5/2016 | Ghosh | ................... | G06F 3/061 |
| | | | | 711/103 |

* cited by examiner

ENTRIES IN ADDRESS TRANSLATION CACHE

| 205 VIRTUAL ADDRESS BITS [47:12] | 210 PHYSICAL ADDRESS BITS [47:12] | 215 PAGE SIZE | 220 ATTRIBUTE BITS | 222 V | 225 ENTRY TYPE |
|---|---|---|---|---|---|
| | | 16kB<br>64kB<br>256kB<br>2MB<br>32MB | | | LEAF<br>COALESCED<br>COALESCED CH SET<br>BLOCK |

TECHNIQUE FOR DETERMINING ADDRESS TRANSLATION DATA TO BE STORED WITHIN AN ADDRESS TRANSLATION CACHE

BACKGROUND

The present technique relates to the determining of address translation data to be stored within an address translation cache.

It is known to provide data processing systems which incorporate an address translation cache, such as a translation lookaside buffer (TLB), to store address translation data relating to the translation of, for example, virtual addresses to physical addresses. The address translation data can also provide attribute data regarding the memory accesses being made, such as permission data and memory attributes. Whilst the provision of an address translation cache is useful in improving performance by reducing the number of slow page table walks required, such an address translation cache can occupy significant circuit resources, and accordingly it is desirable to make efficient utilisation of those resources.

Each entry in the address translation cache may provide address translation data for a page in memory. There are a number of known software techniques that can be used to form larger pages, but situations where such techniques can be used are often limited. Whilst page aggregation can instead be performed in hardware to seek to overcome such limitations, known hardware techniques can impact latency in the handling of requests issued to the address translation cache by associated circuitry, for example a processor core. It would hence be desirable to provide an improved mechanism for allowing more efficient utilisation of entries in the address translation cache.

SUMMARY

In a first example of the present disclosure, there is provided an apparatus comprising an address translation cache having a plurality of entries, each entry to store address translation data used when converting a virtual address into a corresponding physical address of a memory system; control circuitry to perform an allocation process to determine the address translation data to be stored in each entry; an interface to receive access requests from a request source, each access request identifying a virtual address; and prefetch circuitry, responsive to a contiguous access condition being detected from the access requests received by the interface, to retrieve one or more descriptors from a page table, where each descriptor is associated with a virtual page, in order to produce candidate coalesced address translation data relating to multiple contiguous virtual pages, and to trigger the control circuitry to allocate into a selected entry of the address translation cache coalesced address translation data derived from the candidate coalesced address translation data.

In another example, there is provided a method of determining address translation data to be stored within an address translation cache having a plurality of entries, each entry for storing address translation data used when converting a virtual address into a corresponding physical address of a memory system, the method comprising: performing an allocation process to determine the address translation data to be stored in each entry; receiving access requests from a request source, each access request identifying a virtual address; responsive to a contiguous access condition being detected from the received access requests, employing prefetch circuitry to retrieve one or more descriptors from a page table, where each descriptor is associated with a virtual page, in order to produce candidate coalesced address translation data relating to multiple contiguous virtual pages; and triggering the allocation process to cause the allocation into a selected entry of the address translation cache of coalesced address translation data derived from the candidate coalesced address translation data.

In a yet further example, there is provided an apparatus comprising: address translation cache means for having a plurality of entries, each entry for storing address translation data used when converting a virtual address into a corresponding physical address of a memory system; control means for performing an allocation process to determine the address translation data to be stored in each entry; interface means for receiving access requests from a request source, each access request identifying a virtual address; and prefetch means for retrieving, in response to a contiguous access condition being detected from the access requests received by the interface means, one or more descriptors from a page table, where each descriptor is associated with a virtual page, in order to produce candidate coalesced address translation data relating to multiple contiguous virtual pages, and for triggering the control means to allocate into a selected entry of the address translation cache means coalesced address translation data derived from the candidate coalesced address translation data.

BRIEF DESCRIPTION OF THE DRAWINGS

The present technique will be described further, by way of illustration only, with reference to examples thereof as illustrated in the accompanying drawings, in which:

FIG. 4 schematically illustrates the contents of each entry within the address translation cache in accordance with one example arrangement;

DESCRIPTION OF EXAMPLES

Figure 1:
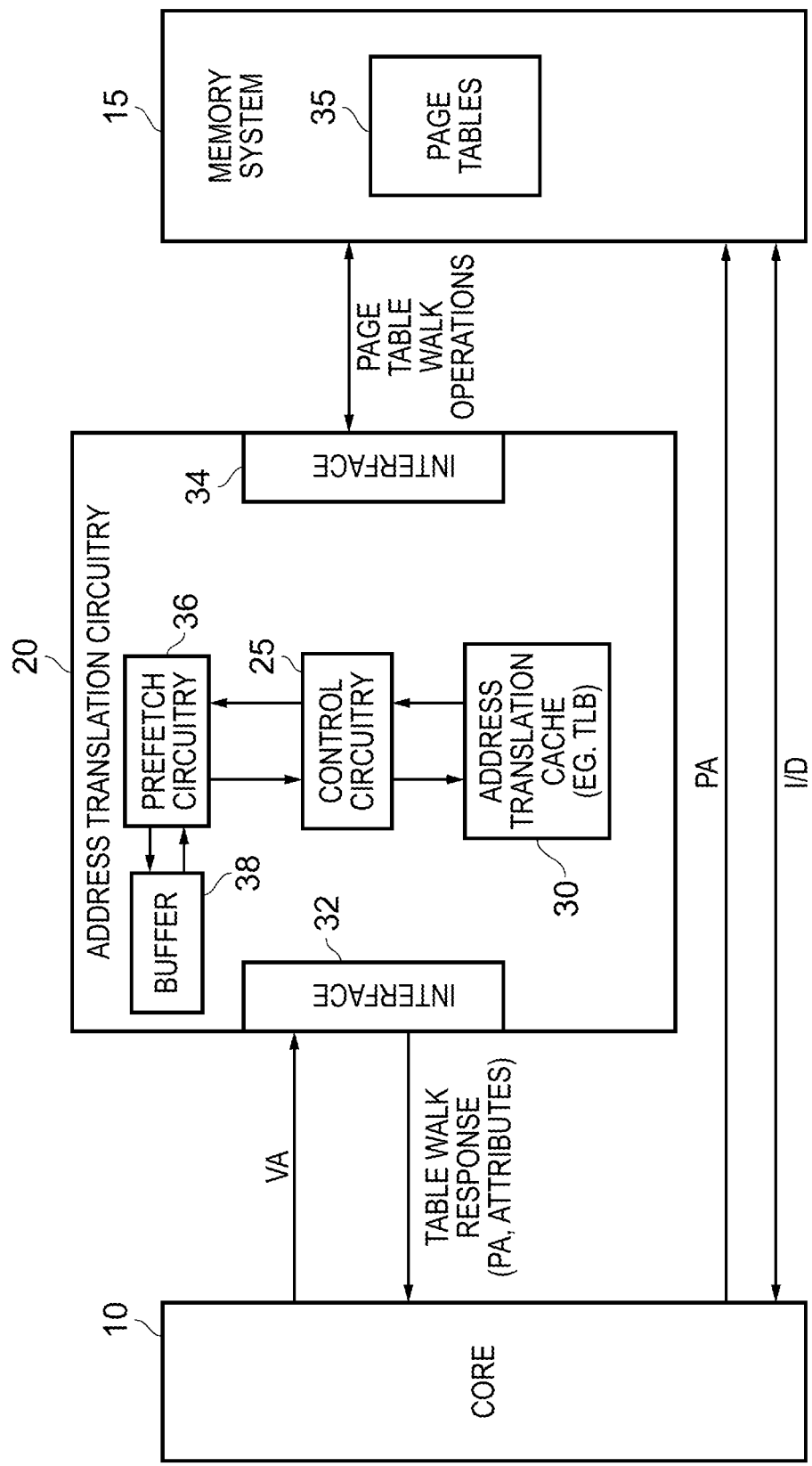
FIG. 1 illustrates a data processing system incorporating an address translation cache in accordance with one example.

As mentioned earlier, when seeking to make more efficient utilisation of the entries within an address translation cache such as a TLB, software techniques can be used to form larger pages, for example through the use of block descriptors or contiguous hints. However, there is limited flexibility with such approaches since the size of these larger pages is limited to architecturally supported page sizes. For example, in the Arm architecture a 16 KB grain size may allow a 2 MB super page (using contiguous hint) or a 32 MB super page (using block descriptors). This requires aggregation of a large number of pages to create a super page, which is not always possible due to fragmentation.

Page aggregation can also be performed in hardware to seek to overcome such limitations, by creating coalesced TLB entries providing address translation data derived from multiple descriptors obtained from a page table. However, known techniques can impact latency in the handling of requests issued to the address translation cache by associated circuitry, for example a processor core. For instance, on a miss in the TLB, multiple descriptors may be fetched from memory to see if a coalesced page can be created. However the number of descriptors that may be fetched at a time during a page table walk is typically limited (e.g. to a cache line's worth of descriptors). Coalescing of large numbers of pages may then require the table walk to stall until all the required cache lines are fetched and analysed. This can significantly impact the latency of the request that missed in the TLB.

The techniques described herein seek to provide a more efficient mechanism for generating coalesced address translation data for storage in an address translation cache.

In one example, an apparatus is provided that has an address translation cache comprising a plurality of entries, where each entry can store address translation data used when converting a virtual address into a corresponding physical address of a memory system. Control circuitry is provided to perform an allocation process to determine the address translation data to be stored in each entry. The apparatus has an interface via which it receives access requests from a request source, each access request identifying a virtual address. The request source can take a variety of forms, but in one example is a processor core. When the processor core issues requests for instructions and/or data, it specifies a virtual address, and the apparatus is arranged, through reference to the address translation cache, to identify information enabling the virtual address to be converted into a physical address within the memory system, so that the identified instruction and/or data can then be accessed in the memory system.

In accordance with the examples described herein, the apparatus further comprises prefetch circuitry, which is responsive to a contiguous access condition being detected from the access requests received by the interface, to retrieve one or more descriptors from a page table, where each descriptor is associated with a virtual page, in order to produce candidate coalesced address translation data relating to multiple contiguous virtual pages. Further, the prefetch circuitry is arranged to trigger the control circuitry to allocate into a selected entry of the address translation cache coalesced address translation data that is derived from the candidate coalesced address translation data produced by the prefetch circuitry.

The operations of the prefetch circuitry may be arranged so that they do not impact the ongoing processing of access requests received by the apparatus from the request source. For example, for each received access request, a lookup within the address translation cache can still be performed, and in the event of a hit a response to that access request can be provided using the address translation data within the address translation cache. Further, in the event of a miss, a page table walk process can be initiated to retrieve the required address translation data from a page table in memory. However, in parallel with such activities, once the contiguous access condition has been detected, the prefetch circuitry can operate as discussed above to retrieve descriptors from a page table, with the aim of seeking to produce candidate coalesced address translation data that can then subsequently be used to derive coalesced address translation data to be allocated into the address translation cache.

At the time the control circuitry is triggered to perform an allocation, the actual coalesced address translation data to be allocated into the selected entry of the address translation cache can then be derived from the current state of the candidate coalesced address translation data. Hence, even if the address translation cache can only support a limited number of page sizes, there is no requirement for that constraint to be placed on the activities of the prefetch circuitry, and the prefetch circuitry hence has significantly enhanced flexibility when developing the candidate coalesced address translation data.

By such an approach, the apparatus is able to produce coalesced address translation data for allocating into the address translation cache in a flexible and efficient manner, without impacting on the latency of the handling of live access requests from the request source.

The contiguous access condition can take a variety of forms, but in one example arrangement is detected when a plurality of access requests received at the interface specify virtual addresses within contiguous virtual pages. Whilst in one example arrangement, the contiguous access condition may be detected when one or more of those access requests give rise to a miss within the address translation cache, this is not a requirement, and in other examples the contiguous access condition may be detected even where the plurality of access requests that specify virtual addresses within contiguous virtual pages have resulted in hits within the address translation cache. In particular, irrespective of whether the relevant access requests have resulted in a hit or a miss within the address translation cache, the fact that there are a sequence of access requests specifying virtual addresses within contiguous virtual pages provides an indication that there may be an opportunity to develop coalesced address translation data for storing within the address translation cache, for example to cover not only the translations required by the access requests issued thus far, but also subsequent access requests that may continue to specify virtual addresses within subsequent contiguous virtual pages.

Hence, in one example, the prefetch circuitry is arranged to retrieve the one or more descriptors with the aim that the multiple contiguous virtual pages to which the candidate coalesced address translation data relates include one or more additional virtual pages beyond the contiguous virtual pages that resulted in the contiguous access condition being detected. By such an approach, the prefetch circuitry can seek to develop coalesced address translation data for a sufficiently large number of contiguous virtual pages, such that once the coalesced address translation data is then allocated into the address translation cache, there is an expectation that that allocated address translation data may then give rise to hit conditions being detected within the address translation cache for subsequent access requests received from the request source.

In one example arrangement, each descriptor is associated with a physical page in the memory system, and the candidate coalesced address translation data relates to multiple contiguous virtual pages that map to multiple physical pages within the memory system that meet specified page alignment criteria. The page alignment criteria can take a variety of forms, but in one example may require that the multiple physical pages are also contiguous.

In one example approach, the candidate coalesced address translation data may be produced so that, following the trigger, that same candidate coalesced address translation data is then allocated into the selected entry of the address translation cache to form the coalesced address translation data. Hence, in such instances the control circuitry may not need to make any modification to the coalesced address translation data before allocating it into the address translation cache.

However, as mentioned earlier, additional flexibility can be afforded by allowing the prefetch circuitry to develop candidate coalesced address translation data that may not necessarily correspond directly with a potentially limited number of page sizes supported by the address translation cache. In particular, in one example arrangement, the address translation cache has one or more supported page sizes for coalesced address translation data within the address translation cache, and the control circuitry is responsive to the candidate coalesced address translation data exceeding a supported page size, to perform a fracturing operation in order to derive the coalesced address translation data to be allocated into the address translation cache. Hence, purely by way of example, if each retrieved descriptor relates to a 4 KB page, and the address translation cache supports a page size of 64 KB for coalesced address translation data (i.e. address translation data that would relate to 16 contiguous 4 KB pages), then if at the time of the trigger the prefetch circuitry had coalesced twenty one 4 KB pages, a fracturing operation could be performed in order to produce the address translation data for a 64 KB page, with that determined address translation data then being allocated into an entry of the address translation cache.

Such an approach provides significant flexibility, particularly where there may be more than one supported page size for coalesced address translation data. In particular, the prefetch circuitry can speculatively seek to generate coalesced address translation data for as large a number of virtual pages as possible, and then at the time the trigger to allocate into the address translation cache occurs, a decision can be taken as to the most appropriate form of coalesced address translation data to be allocated into the address translation cache. Indeed, it should be noted that it might be possible at that point to create multiple items of coalesced address translation data from the candidate coalesced address translation data produced. For example, if the candidate coalesced address translation data related to an 80 KB page at the time of the trigger, and the address translation cache supported both 64 KB and 16 KB as page sizes for coalesced address translation data, then it may be possible to create both an item of coalesced address translation data for a 64 KB page and a further item of coalesced address translation data for a 16 KB page.

The prefetch circuitry can be arranged in a variety of ways to enable it to produce the candidate coalesced address translation data. However, in one example the prefetch circuitry has associated buffer storage in which a buffer entry is allocated to maintain the candidate coalesced address translation data, and the prefetch circuitry is arranged in response to detection of the contiguous access condition to determine for each retrieved descriptor, with reference to the candidate coalesced address translation data, whether coalescing criteria are met by that retrieved descriptor. In the presence of said coalescing criteria being met, that descriptor is then used to update the candidate coalesced address translation data maintained in the buffer entry. On a trigger condition, the prefetch circuitry then causes the control circuitry to perform the allocation process to store in the selected entry of the address translation cache the coalesced address translation data derived from the candidate coalesced address translation data maintained in the buffer entry.

In one example arrangement, when an active request is received at the interface from the request source, a lookup operation can be performed in both the address translation cache and the prefetch buffer storage in order to determine if there is a hit condition. If a hit is detected in the prefetch buffer, then that information can be used to return the required address translation data to the request source, so as to avoid a redundant page table walk. If the address translation data in the buffer entry does not yet cover the minimum number of pages required for allocation of a coalesced entry into the address translation cache, the allocation circuitry can at that time allocate an entry within the address translation cache to hold the non-coalesced address translation data returned in relation to the active request using the information held in the prefetch buffer. If the address translation data in the buffer entry does cover the minimum number of pages required for allocation of a coalesced entry into the address translation cache, it will be known that a coalesced entry will be able to be allocated at some future point into the address translation cache, but it may be decided at the time of the hit within the prefetch buffer not to allocate a coalesced entry yet within the address translation cache, since this entry will later turn out to be redundant if an even larger coalesced page can be created.

By having access to a buffer entry, the prefetch circuitry can perform a sequence of steps in order to build up the candidate coalesced address translation data, with the contents of the buffer being updated accordingly at each step. For example, the prefetch circuitry may be arranged to perform a series of page table walk operations, with each page table walk operation resulting in the retrieval of one or more descriptors. The descriptor or descriptors retrieved as a result of each page table walk operation can then be analysed in order to determine whether they meet the required coalescing criteria that would enable the information within those descriptors to be used to update the candidate coalesced address translation data. This process can continue until a trigger condition arises, causing a determination to be made at that point as to whether the current form of the candidate coalesced address translation data will enable allocation of coalesced address translation data to be made into a selected entry of the address translation cache.

The trigger condition can take a variety of forms, but in one example arrangement comprises at least one of the candidate coalesced address translation data relating to a determined maximum number of multiple contiguous virtual pages, the candidate coalesced address translation data relating to a maximum supported page size for coalesced address translation data within the address translation cache, or the coalescing criteria no longer being met. Hence, by such an approach, it can be seen that a maximum limit can be placed on the number of pages represented by the candidate coalesced address translation data if desired. Also, the trigger condition can arise if the prefetch circuitry determines that the coalescing criteria is no longer being met. In this latter case, the control circuitry may then need to determine whether the current form of the coalesced address translation data covers a sufficiently large number of pages to enable an allocation to be made into an entry of the address translation cache, having regard to the supported page sizes.

The coalescing criteria can take a variety of forms, and may for example include factors such as page alignment criteria and attribute match criteria. In one example arrangement, as soon as it is detected that the coalescing criteria is no longer being met by the descriptors retrieved by the prefetch circuitry, then the process of developing the candidate coalesced address translation data can be stopped, and instead the control circuitry can be triggered to determine whether coalesced address translation data can be allocated into the address translation cache based on the current form of the candidate coalesced address translation data.

However, in an alternative arrangement, the prefetch circuitry may be arranged to continue to seek to develop candidate coalesced address translation data even if the coalescing criteria is determined not to be met by one or more retrieved descriptors. In particular, the prefetch circuitry may be arranged to allow the coalescing criteria to be absent from one or more retrieved descriptors whilst continuing to retrieve further descriptors with the aim of updating the candidate coalesced address translation data maintained in the buffer entry prior to the trigger condition occurring. In such situations, the candidate coalesced address translation data is arranged to identify any virtual/physical pages for which the candidate coalesced address translation data should not be used. This can provide enhanced flexibility by overlooking one or more pages for which the coalescing criteria is not met, but then effectively flagging that fact within the candidate coalesced address translation data. That information can then also be propagated across into the address translation cache entry if coalesced address translation data is subsequently allocated into that entry based on the candidate coalesced address translation data.

From the above discussion, it will be appreciated that in one example arrangement, by the time the contiguous access condition is detected, a plurality of access requests specifying virtual addresses within contiguous virtual pages will have been received. Accordingly, lookup operations within the address translation cache are likely to have been made for those received virtual addresses, and it may be that, for at least some of those virtual addresses, address translation data is already available within the address translation cache. In such instances, the prefetch circuitry may be arranged to determine an initial form of the candidate coalesced address translation data from any address translation data detected to be present in the address translation cache for one or more of the access requests received at the interface that caused the contiguous access condition to be detected.

As mentioned earlier, the prefetch circuitry may be arranged to perform a series of page table walk operations in order to retrieve descriptors from the page table in order to seek to expand the candidate coalesced address translation data being maintained within the buffer entry. Each page table walk operation may cause at least one descriptor to be obtained from the page table, and in one example multiple descriptors (e.g. 2, 4, 8, etc.) may be retrieved in response to each page table walk operation. However, prior to performing each page table walk operation, it is possible to perform a lookup within the address translation cache to see if relevant address translation data is already stored within the address translation cache. In particular, for each page table walk operation the prefetch circuitry may be arranged to determine a virtual address to be issued in order to retrieve said at least one descriptor, and to perform a lookup in the address translation cache using the virtual address to determine whether address translation data associated with the virtual address is already present within the address translation cache. If so, it can then use the address translation data accessed from the address translation cache rather than seeking to retrieve from the page table the descriptor associated with the virtual page identified by the virtual address. This can enhance efficiency by avoiding unnecessary page table walks when the required information is already present within the address translation cache.

It is possible that as a result of the lookup in the address translation cache, a hit might be detected for a coalesced entry, and as a result the address translation data returned from the address translation cache may relate to multiple descriptors, and can be used to update the coalesced address translation data in the prefetch buffer. The subsequent virtual address generated by the prefetch circuitry will take into account the number of descriptors covered by the address translation information obtained from the hit entry in the address translation cache, or, in the absence of a hit, the number of descriptors retrieved as a result of the last page table walk operation.

As mentioned earlier, each descriptor may be associated with a physical page in the memory system, and the candidate coalesced address translation data may relate to multiple contiguous virtual pages that map to multiple physical pages within the memory system that meet specified page alignment criteria. In one example, the prefetch circuitry may then be arranged to determine whether the coalescing criteria is met by determining whether updating the candidate coalesced address translation data to cover the physical page associated with the descriptor under consideration would allow the specified page alignment criteria to continue to be met. Hence, at least part of determining whether the coalescing criteria is met may involve determining whether page alignment criteria will continue to be met.

The specified page alignment criteria can take a variety of forms, but in one embodiment may require the physical pages covered by the candidate coalesced address translation data to be contiguous physical pages. Hence, as each new descriptor is evaluated by the prefetch circuitry, the prefetch circuitry will determine whether the physical page associated with that descriptor continues to be related to a contiguous series of physical pages taking account of the current contiguous physical pages covered by the candidate coalesced address translation data.

In one example arrangement, each descriptor may further comprise attribute data identifying a plurality of attributes, and the candidate coalesced address translation data covers physical pages for which attribute match criteria is met. The prefetch circuitry may then be arranged to determine whether the coalescing criteria is met by further determining whether updating the candidate coalesced address translation data to cover the physical page associated with the descriptor would allow the attribute match criteria to continue to be met.

Hence, in such embodiments, as part of assessing whether the coalescing criteria is met, the prefetch circuitry will determine whether the attributes identified within the descriptor currently under consideration meet the attribute match criteria when compared with the attributes already being maintained for the candidate coalesced address translation data.

In one example, the attribute match criteria may require absolute equality between all of the attributes. Hence, for the contents of the descriptor under consideration to be used to update the candidate coalesced address translation data, then it may be required that all of the attributes for that descriptor must match the attributes currently being maintained for the candidate coalesced address translation data.

However, in an alternative example, the attribute match criteria may be relaxed to the extent that not all of the attributes need to be the same. In particular, the attribute match criteria may allow the plurality of physical pages covered by the candidate coalesced address translation data to have different values for a first subset of the attributes when determining that the attribute match criteria is met. By enabling some variation in the values of certain attributes whilst still determining that the attribute match criteria is met, such a technique can significantly increase the occurrences where coalesced address translation data can be generated, and hence may significantly increase the effectiveness of the operations performed by the prefetch circuitry. In such an example arrangement, the information maintained within the candidate coalesced address translation data can be used to capture the differences between the attributes that are allowed not to take the same value for the various pages covered by the candidate coalesced address translation data.

Whilst the descriptors obtained from the page table may in principle be intermediate level descriptors identified during a multi-level page table walk process, in one embodiment the descriptors reviewed by the prefetch circuitry when developing the candidate coalesced address translation data are final level descriptors identified during a multi-level page table walk process. Such final level descriptors provide sufficient information in combination with the other descriptors obtained during the multi-level page table walk process to provide a full translation from the virtual address to a physical address.

In some examples, there may be more than one type of final level descriptor provided. For example, the final level descriptors may be page descriptors or block descriptors as discussed in the Arm Architecture Reference Manual, page descriptors being obtained at a final provided level of the page table walk process, whilst block descriptors can be reached before the final level of a page table walk process. In some instances, such page descriptors are also referred to as leaf descriptors.

Particular embodiments will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes an address translation cache 30, which in one example may take the form of a translation lookaside buffer (TLB). The address translation cache 30 has a plurality of entries, where each entry stores address translation data used when converting a virtual address into a corresponding physical address of a memory system. The address translation data is determined by performing page table walk operations in respect of page tables 35 stored within the memory system 15. As will be discussed later with reference to FIG. 3, a multi-level page table walk process may be used in order to obtain, with reference to a final level descriptor, full address translation data enabling a virtual address to be converted into a physical address, and that full address translation data may be stored within the address translation cache 30. Taking the example where the address translation cache is a TLB, a TLB is usually used to store such full address translation data. In one example arrangement, the techniques described herein to generate coalesced address translation data are performed in respect of full address translation data obtained with reference to such final level descriptors.

As shown schematically in FIG. 1, when the core 10 issues a virtual address to the address translation circuitry 20, the control circuitry can perform a lookup operation within the address translation cache 30 to determine whether a hit is detected within one of the entries of the address translation cache. If the address translation cache is arranged in a fully associative manner, all of the entries may be considered during the lookup operation. However, if the address translation cache has a set associative structure, then certain bits of the virtual address will be used as an index into the address translation cache in order to identify a set, and the entries within that set will be reviewed in order to determine whether a hit is detected. If a hit is detected, then a table walk response can be returned directly to the processor core 10, this including physical address bits and associated attributes stored within the hit entry within the address translation cache. Based on this information, the core can then generate a physical address to output to the memory system 15 in order to access a required instruction, or data to be manipulated. If a hit is not detected within the address translation cache, the address translation circuitry 20 will initiate a page table walk process in order to access the relevant page tables 35 within the memory system in order to walk through a sequence of descriptors until a final level descriptor is obtained, at which point full address translation data can be determined and an appropriate table walk response can then be returned to the core. During this process, one or more entries within the address translation cache 30 can be allocated to store address translation data derived from the accessed descriptors. This is likely to enable a subsequently issued virtual address to result in a hit within the address translation cache, thereby reducing access times.

As shown in FIG. 1, the address translation circuitry has an interface 32 for receiving requests from the processor core 10 specifying virtual addresses, and for outputting to the processor core table walk responses that then enable the processor core to generate a physical address to output to the memory system. Further, an additional interface 34 is provided to allow the address translation circuitry to communicate with the memory system 15 in order to perform page table walk operations.

In addition, the address translation circuitry 20 is provided with prefetch circuitry 36 which can be employed under certain circumstances to seek to prefetch a series of descriptors from the page tables 35 with the aim of establishing candidate coalesced address translation data within an entry of a buffer 38 provided in association with the prefetch circuitry 36. In particular, based on an analysis of the requests received from the processor core 10 at the interface 32, a contiguous access condition can be detected when those access requests follow one or more predetermined patterns. For instance, in one example arrangement, when a plurality of the access requests received at the interface 32 specify virtual addresses within contiguous virtual pages, this will cause the contiguous access condition to be detected. The prefetch circuitry 36 will allocate an entry within its buffer 38 for use in building up candidate coalesced address translation data. The time at which an entry is allocated within the prefetch circuitry can be varied dependent on implementation. However, in one example an entry is allocated for an access request as soon as it is decided to start monitoring the subsequent access requests that will follow that access request in order to determine whether the contiguous access condition is present. By such an approach, it is possible to then initialize the buffer entry using any information already available from the address translation cache 30 or descriptors returned by page table walk for access requests that are determined to relate to contiguous virtual pages whilst the prefetch circuitry is still monitoring the received access requests to determine whether the contiguous access condition is present. If the prefetch circuitry ultimately decides that the contiguous access condition is not present, then the buffer entry can merely be invalidated. However, if the prefetch circuitry does in due course decide that the contiguous access condition is present, then the contents of the buffer entry will already contain initial candidate coalesced address translation information, and then the prefetch circuitry 36 can perform a series of page table walk operations in order to obtain further descriptors from the page tables 35 so as to seek to establish within the relevant buffer entry of the buffer 38 candidate coalesced address translation data that covers an enlarged series of multiple contiguous virtual pages.

The buffer circuitry will typically comprise multiple buffer entries, and hence at any point in time the prefetch circuitry can be monitoring multiple potential streams of access requests to contiguous virtual pages, and then whenever it is detected that one of the potential streams being monitored is actually a stream of access requests to contiguous virtual pages, then the contiguous access condition is detected for that stream, and accordingly the prefetch circuitry can perform the above operations to seek to produce relevant coalesced address translation data for that stream.

The above-described process can be performed in parallel with any servicing of the ongoing requests from the processor core via the control circuitry 25 and the address translation cache 30. It has been found that the prefetching activities of the prefetch circuitry 36 used to seek to establish candidate coalesced address translation data can be performed with little or no latency impact on the handling of live requests from the processor core 10. For example, the address translation circuitry may form part of a memory management unit (MMU), and modern MMUs often have multiple state machines that can perform independent page table walks. It is typically the case that one or more of the state machines will be available at any point in time for use by the prefetch circuitry, without any impact on the servicing of live requests from the processor core.

As a result, following detection of the contiguous access condition, the prefetch circuitry can operate to seek to establish candidate coalesced address translation data within the buffer (starting with any initialised address translation data stored within the buffer entry during the monitoring of the access requests prior to detecting the contiguous access condition), and during that process the address translation cache 30 operates as normal. However, when a trigger condition is reached, the prefetch circuitry 36 will then contact the control circuitry 25 to request the control circuitry to seek to allocate coalesced address translation data into an entry of the address translation cache, where that coalesced address translation data is derived from the candidate coalesced address translation data held within the buffer 38.

It may be the case that the candidate coalesced address translation data can at that point be used directly to form the coalesced address translation data to be stored within the address translation cache. However, it is often the case that there will only be a certain number of predefined page sizes that are supported within the address translation cache for the storage of coalesced address translation data. If the candidate coalesced address translation data relates to a page size greater than one of those supported page sizes, then the control circuitry can derive the required coalesced address translation data to be stored within the address translation cache from the candidate coalesced address translation data, for example by using a fracturing operation. More details of the operation of the prefetch circuitry 36 will be provided later with reference to the flow diagram of FIGS. 5A and 5B.

Figure 2:
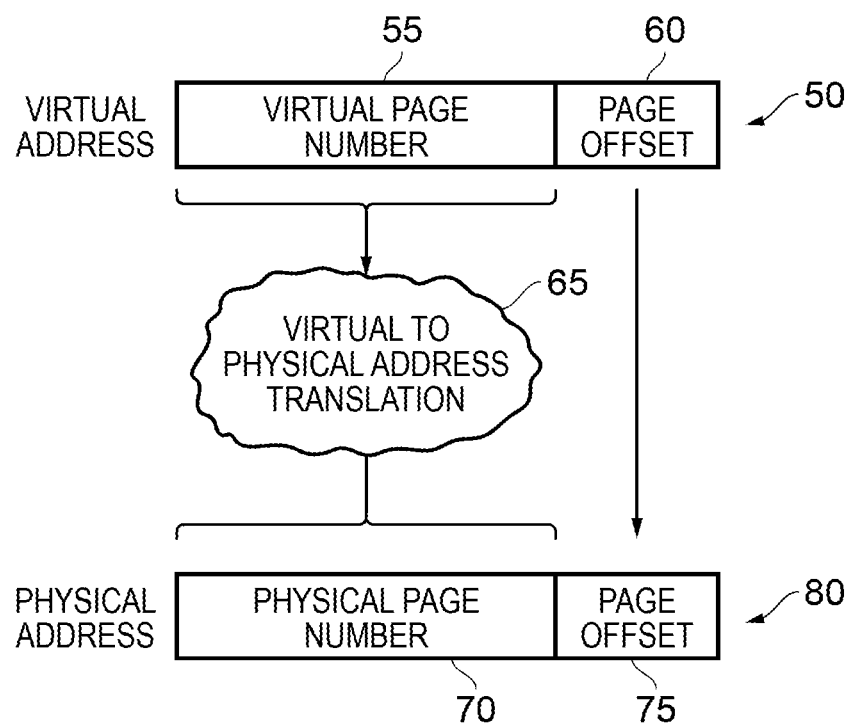
FIG. 2 is a diagram schematically illustrating a virtual to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bit 60 in the virtual address.

Figure 3:
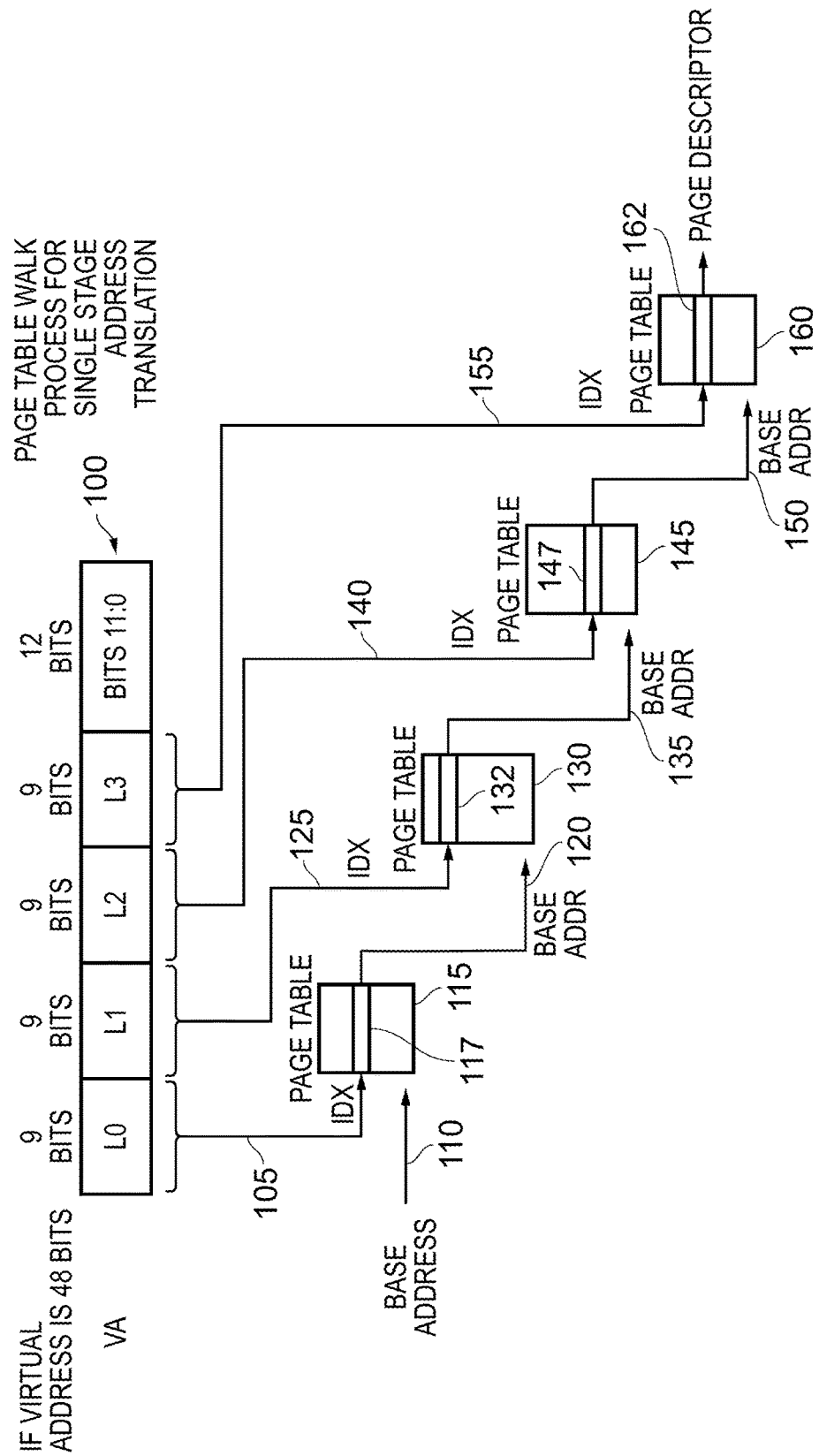
FIG. 3 schematically illustrates a multi-level page table walk which includes a single stage address translation process.

FIG. 3 is a diagram schematically illustrating the page table walk operation assuming there is a single stage address translation mechanism being used. In this example, it is assumed that the virtual address is 48 bits, and hence the virtual address 100 has a series of 9 bit portions associated with different levels of the page table walk process, with the 12 least significant bits denoting page offset.

At the start of the page table walk process, a base register is accessed to identify a base address 110 that is used to identify the page table 115. The 9 bits 105 associated with level zero of the page table walk process are used to identify an index into that page table 115, and hence identify an intermediate level descriptor 117. This intermediate level descriptor 117 provides a base address 120 that is used to identify a further page table 130, with the level one virtual address bits 125 being used to identify an index into that table. This identifies the intermediate level descriptor 132 that provides a further base address 135 to identify the page table 145. The level 2 virtual address bits 140 are then used to provide an index into that table 145 in order to identify the intermediate level descriptor 147, which then provides the base address 150 that identifies a final page table 160. The level 3 virtual address bits 155 then provide an index into that table 160, identifying a final level descriptor 162 also referred to as a page descriptor. With the information provided by the page descriptor, it is then possible to generate address translation data for storing in one of the entries of the TLB 30 enabling the virtual page number 55 to be converted into a physical page number 70 and hence allowing the required page in memory to be identified. This then enables the particular item of data (or instruction) corresponding to the virtual address to be accessed by the core 10 issuing the required physical address to the memory system 15.

It should be noted that in some embodiments final level descriptors can be specified at an earlier level in the page table walk process. For example, the descriptor 147 can have a block field which, when set, indicates that that descriptor is a block descriptor, which is a type of final level descriptor, rather than being an intermediate level descriptor. Hence, the information within the descriptor 147 can be used to produce the full address translation data.

FIG. 4 is a diagram schematically illustrating the fields that may be provided within each entry of the address translation cache 30 in accordance with one embodiment. As shown, an entry 200 may include a virtual address portion 205 containing a certain number of the virtual address bits. The number of bits stored in this field will be dependent on embodiment, but assuming the earlier example of FIG. 3 where the most significant 36 bits of a 48-bit virtual address are used during the multi-level page table walk process, bits 47 to 12 may be stored within the virtual address field 205. A corresponding physical address field 210 is used to store corresponding physical address bits. When the entry is storing full address translation data, these physical address bits will represent the corresponding physical page number used when translating the virtual address to a physical address. In one example, the address translation cache may be used solely for storing such full address translation data. However, in an alternative arrangement, it may be possible for the address translation cache to additionally store partial address translation data. When an entry stores partial address translation data, the physical address bits in the field 210 will be used to identify a partial translation, for example identifying a base address of the next page table within the page table walk process. Hence, when a hit is detected with regards to partial address translation data, this can enable part of the page table walk process to be avoided, and instead merely the remaining parts of the page table walk process need to be completed in order to identify the full address translation data.

In the example arrangement shown in FIG. 4, a page size field 215 is provided to indicate a page size of a page within the memory system that is associated with the address translation data stored in that entry. The field 220 is used to store other attribute data associated with the address translation data. These attributes can take a variety of forms, and may for example include access permissions, and memory type information, such as whether the associated page relates to a writeback region of memory, a non-cacheable region, etc. A further field 222 is used to store a valid bit to identify if the entry stores valid information.

Further, a field 225 may be provided to indicate an entry type of the address translation data stored within the corresponding entry. For example, the information in this field could be used to identify situations where the address translation data is coalesced address translation data formed from a plurality of adjacent descriptors, or to identify whether the address translation data is derived form a leaf or a block descriptor. As another example, the type field could be used to identify where contiguous hint bits are set causing a software managed coalescing of address translation information to take place. Further, if the address translation cache not only stores full address translation data, but can also store partial address translation data, the entry type can be used to identify whether the entry relates to full address translation data or partial address translation data.

In another example arrangement, the page size information could be encoded as part of the "type" information, such that the page size field 215 and type field 225 are logically combined into a single field that conveys both type and size, thereby potentially reducing the amount of storage required for the combination of the type and size fields.

FIG. 4 illustrates some example page sizes, and the corresponding entry type that may be associated with those page sizes, for a specific example use case. In the example illustrated in FIG. 4, it is assumed that the leaf descriptors relate to 16 KB pages. Using contiguous hint software mechanisms, it may be possible to generate address translation data within the address translation cache which relates to a 2 MB page. Further, by using block descriptors, it may be possible to identify address translation data relating to 32 MB pages. However, it will be appreciated that these page sizes are limited to architecturally supported page sizes, and are relatively large, making the use of such techniques limited. However, in accordance with the coalescing techniques described herein with reference to the prefetch circuitry, it is possible for the prefetch circuitry to produce candidate coalesced address translation data for any number of contiguous pages, and upon a trigger condition that information collated within the buffer 38 of the prefetch circuitry 36 can then be used to derive coalesced address translation data to be stored within the address translation cache. Two example page sizes that may be supported within the address translation cache for such coalesced address translation data as shown in FIG. 4 are a 64 KB page and a 256 KB page. It will be appreciated that other page sizes may also be supported for the storing of coalesced address translation data within the address translation cache.

It will be appreciated that the page sizes illustrated in FIG. 4 are merely examples. In other configurations, different page sizes may be used. For example, in an alternative implementation the leaf descriptors may relate to 4 KB pages, and in such instances it may be possible to generate coalesced pages whose sizes are 16 KB, 64 KB, etc.

Figure 5A:
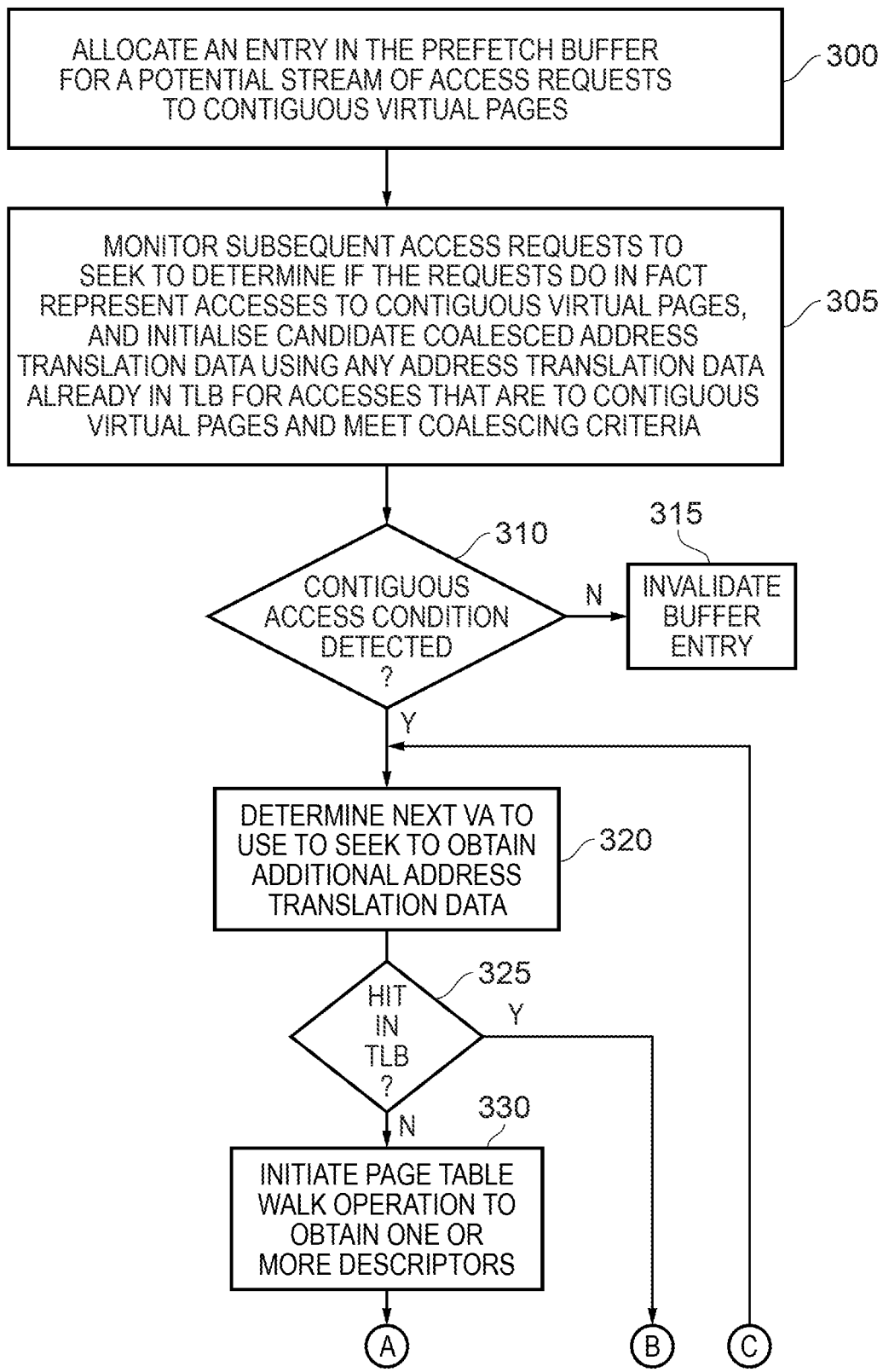
FIGS. 5A and 5B provide a flow diagram illustrating the process performed by the address translation circuitry of FIG. 1 upon detection of a contiguous access condition, in accordance with one example arrangement.
Figure 5B:
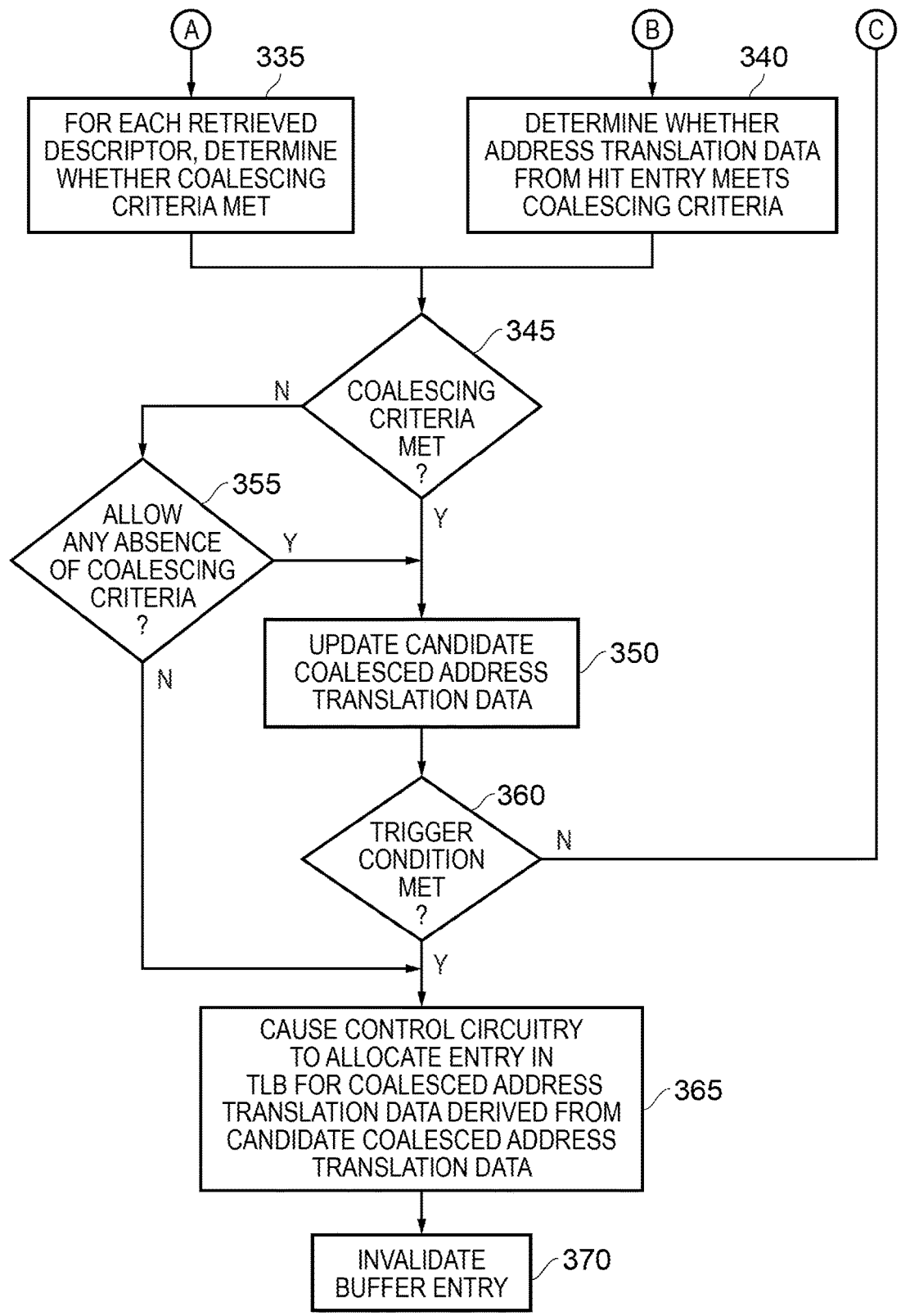

FIGS. 5A and 5B are a flow diagram illustrating the steps performed by the address translation circuitry to seek to establish coalesced address translation data for allocation into the address translation cache. At step 300, the prefetch circuitry decides, based on a received access request, to allocate an entry in the prefetch buffer for a potential stream of access requests to contiguous virtual pages. For example, if the received access request is determined not to relate to contiguous virtual pages associated with any potential stream that is already being monitored by the prefetch circuitry, and assuming there is an available entry within the prefetch buffer, then one of the available entries can be allocated for that access request, so as to allow the prefetch circuitry to start monitoring another potential stream of access requests to contiguous virtual pages.

At step 305, the prefetch circuitry then monitors subsequent access requests received at the interface 32 to seek to determine if those access requests do in fact represent accesses to contiguous virtual pages. It should be noted that, in one example configuration, it is not a requirement that the access requests that relate to contiguous virtual pages are all received sequentially at the interface, and those access requests can be interleaved with other access requests that do not relate to contiguous virtual pages. However, for the contiguous access condition to be detected, the prefetch circuitry in one example may look for a predetermined number of access requests received at the interface that do relate to contiguous virtual pages. The period of time allowed for observing that required number of access requests to contiguous virtual pages can be varied dependent on implementation. For example, timers, confidence counters or other techniques could be used. Considering the confidence counter example, the confidence counter could be incremented each time an access request is observed to a contiguous virtual page, but could be decremented based on certain triggers, for example where one or more intervening access requests do not relate to addresses within the contiguous virtual pages of interest. Then, if the confidence counter reaches a minimum value without the required number of access requests being detected, it may be determined that the contiguous access condition is not present.

As also indicated at step 305, in one example arrangement, if a received access request is determined to relate to a contiguous virtual page within the potential stream being monitored, and a hit occurs within the address translation cache for that access request, then the address translation data from the hit entry can be used to determine if coalescing criteria is met, and if so that address translation data can be incorporated within the address translation data being maintained within the buffer entry so as to form initialised candidate coalesced address translation data. Similarly, if a miss occurred within the address translation cache for such an access request, when the associated page table walk response becomes available the prefetch circuitry can determine whether the coalescing criteria is met, and if so incorporate the address translation data provided by the page table walk response within the address translation data being maintained within the buffer entry.

At step 310, it is determined if the contiguous access condition is detected. This test can be performed on an ongoing basis during performance of step 305, and as soon as the contiguous access condition is detected, the process can proceed to step 320. However, as will be apparent from the earlier discussion, a time limit might be set on the detection of the contiguous access condition, either by directly monitoring the elapse of a chosen time period, or by the use of confidence counters as discussed earlier, and hence if by a certain point the contiguous access condition has not been detected, it can be determined that the contiguous access condition is not present, and the process can proceed to step 315 to invalidate the buffer entry. This may also be determined for example if a number of received access requests relate to contiguous virtual pages, but the address translation data available for those pages indicates that the coalescing criteria is not being met, and again in that instance it may be decided that the contiguous access condition is not present, and the buffer may be invalidated at step 315.

If the contiguous access condition is detected at step 310, and the process hence proceeds to step 320, then taking into account the initialised candidate coalesced address translation data, the prefetch circuitry will then determine at step 320 the next virtual address to be used in order to seek to obtain additional address translation data. This virtual address may in one example relate to the next virtual page in a sequence of contiguous virtual pages that is not yet covered by the candidate coalesced address translation data. Alternatively, if it is known that for all of the access requests already issued by the core, any virtual addresses that missed in the address translation cache have already caused the control circuitry to initiate page table walk operations to retrieve the required descriptors, then the prefetch circuitry can merely use that descriptor information when it is subsequently returned, and will determine as the next virtual address at step 320 the virtual address for the first next contiguous virtual page not already covered by the sequence of access requests that gave rise to detection of the contiguous access condition being detected.

Purely by way of example, if the contiguous access condition was detected due to a series of four virtual addresses being received from the core to pages A, A+1, A+2, A+3, and if for the sake of illustration it is assumed that hits occurred within the address translation cache for pages A and A+1 but that misses occurred for pages A+2 and A+3, if the control circuitry has already initiated page table walk requests for pages A+2 and A+3, the prefetch circuitry can initialise the candidate coalesced address translation data using the information already available from the address translation cache for the pages A and A+1, and in due course can analyse the page table walk responses for pages A+2 and A+3 to see whether that address translation information can be coalesced with the current candidate coalesced address translation data. At step 320, it can then determine that the next virtual address to use is an address for page A+4.

In the example illustrated in FIG. 5A, once the next virtual address has been determined at step 320, then before initiating a page table walk for that address, the prefetch circuitry first causes a lookup to be performed by the control circuitry 25 within the address translation cache 30 for the virtual address determined at step 320, in order to determine whether a hit is detected. At this stage, a hit could be detected for either a non-coalesced entry or for an existing coalesced entry, and if a hit is detected the process proceeds to step 340 discussed in more detail below. If a hit is not detected, then the prefetch circuitry will initiate a page table walk operation to obtain one or more descriptors at step 330. For the purposes of the illustrated example, it will be assumed that coalesced address translation data will only be produced for full address translation data, and accordingly the descriptors that are analysed by the prefetch circuitry are the final level descriptors retrieved from the page table walk process. Depending on the interface width to the memory system, each page table walk operation may not merely retrieve a single descriptor, but may in fact retrieve multiple final level descriptors, for example 2, 4 or 8, and hence performance of step 330 may result in a plurality of final level descriptors being retrieved for analysis.

It will be appreciated that the address translation circuitry can in some instances include some further cache structures between the address translation cache 30 and the interface 34. For example, a walk cache may be used to cache partial address translation information, and if a hit is detected within the walk cache, this can reduce the number of levels of the page table walk process required in order to obtain the final level descriptors.

At step 335, for each retrieved descriptor, the prefetch circuitry is arranged to determine whether coalescing criteria are met, hence allowing the address translation data identified in that descriptor to be incorporated within the candidate coalesced address translation data being maintained within the entry of the buffer 38. The coalescing criteria can take a variety of forms, but in one embodiment may comprise both page alignment criteria and attribute match criteria. The page alignment criteria can take a variety of forms, but in one example arrangement requires that coalesced address translation data that relates to multiple contiguous virtual pages also relates to contiguous physical pages. With regards to the attribute match criteria, in one example arrangement it may be a requirement that the attribute bits for all of the pages that are being coalesced are the same. Alternatively, as will be discussed later with reference to FIGS. 8A and 8B, it may be possible to relax the conditions for meeting the attribute match criteria, so that a certain subset of the attributes may be allowed to differ between the pages represented by the candidate coalesced address translation data.

In addition to performing step 335 for each descriptor retrieved as a result of a page table walk operation initiated directly by the prefetch circuitry, if the prefetch circuitry is awaiting the page table walk results of some initial walks initiated by the control circuitry due to misses in the address translation cache, those descriptors can also be analysed at step 335 by the prefetch circuitry to determine whether the coalescing criteria is met.

Returning to step 325, if a hit occurs in the TLB when using the virtual address determined at step 320, then the process proceeds directly to step 340 where it is determined whether the address translation data from the hit entry meets the coalescing criteria. It will be appreciated that this address translation data that is already resident in the address translation cache will be address translation data that has been derived from the descriptor for the relevant virtual address. Indeed, as mentioned earlier, it is also possible to hit on an already existing coalesced entry, where the address translation data will then have been derived from multiple descriptors. At step 340, it is not necessary to analyse each descriptor separately in such a case, as the multiple descriptors covered by the address translation data will already previously have been determined to meet the requirements for being coalesced together, and accordingly it merely needs to be determined whether the address translation data covered by the coalesced entry can itself be coalesced with the existing contents in the prefetch buffer.

Following steps 335 or 340, it is then determined at step 345 whether the coalescing criteria has been met, and if so the candidate coalesced address translation data is updated at step 350 to incorporate the additional address translation data that has now been obtained.

Given that each page table walk operation may in some examples cause multiple descriptors to be retrieved, then each of those retrieved descriptors can be evaluated in turn. If the coalescing criteria is met by all of those retrieved descriptors, then the candidate coalesced address translation data can be readily updated to incorporate the address translation information derived from all of those descriptors. If the coalescing criteria is met by some, but not all, of those descriptors, then there are a number of options that can be taken. Firstly, it could be decided to perform no update to the candidate coalesced address translation data, and instead to proceed directly to step 365, i.e. treat the lack of the coalescing criteria being met by at least one of the descriptors as an indication that the trigger condition has now arisen. Alternatively, if the coalescing criteria is met by some but not all of the descriptors analysed at step 335, it may be possible to perform a partial update of the candidate coalesced translation data. Purely by way of example, if four descriptors are retrieved as a result of the page table walk operation initiated at step 330, those descriptors relating to pages A, A+1, A+2 and A+3, and the coalescing criteria is met by the descriptors associated with pages A and A+1, but not by the descriptors associated with pages A+2 and A+3, it may be decided to update the candidate coalesced address translation data to incorporate the address translation data derived from the first two descriptors (i.e. those associated with pages A and A+1). It could then be decided to consider the trigger condition to now have been met at step 360, and proceed directly to evaluating whether coalesced address translation data can be allocated into the address translation cache based on the current state of the candidate coalesced address translation data.

As a further alternative, the prefetch circuitry may be arranged so that it can overlook a certain number of descriptors not meeting the coalescing criteria. This is indicated by the step 355. In particular, if one or more descriptors are allowed not to meet the coalescing criteria, whilst still taking the overall view that the coalescing criteria has been met, the process can proceed via step 355 to step 350 where the candidate coalesced address translation data can be updated based on the retrieved descriptors. However, as will be discussed later with reference to FIG. 7, in such an embodiment the fields provided within the buffer will be supplemented so as to enable sufficient information to be captured about which pages are not covered by the coalesced address translation data being maintained within the buffer. In this latter case, the fact that one or more descriptors do not meet the coalescing criteria individually will not in itself cause the trigger condition to be detected at step 360, and instead the process can return to step 320 to determine the next virtual address to use to seek to obtain additional address translation data.

The trigger condition evaluated at step 360 can take a variety of forms. In one example arrangement, the prefetch circuitry may merely continue to seek to expand the number of pages covered by the candidate coalesced address translation data until it is determined that the coalescing criteria is no longer met (or where a certain number of pages are allowed not to meet the coalescing criteria, that maximum number of pages has been reached). At that point the trigger condition can be determined to be met at step 360, and the process will proceed to step 365.

In one arrangement, the above may be the only limitation applied by the prefetch circuitry when determining whether the trigger condition is met. However, alternatively, one or more other additional constraints may also be used. For example, there may be a predetermined maximum number of multiple contiguous virtual pages that can be covered by the candidate coalesced address translation data, and in that case it can be determined at step 360 whether that maximum number has yet been reached. As an alternative, it may be determined not to exceed a maximum supported page size for coalesced address translation data within the address translation cache. For example, considering the earlier illustrated example in FIG. 4, it may be that 256 KB is the maximum coalesced page size supported, and accordingly once the candidate coalesced address translation data relates to a page size of 256 KB, it may be determined that the trigger condition has been met.

However, it will be appreciated that it is not necessary to stop at that point, and instead a higher upper limit may be placed on the allowable page size to be covered by the candidate coalesced address translation data. For example, it may be that if candidate coalesced address translation data is developed within the buffer for a page size that exceeds the maximum page size supported for coalesced address translation data within the address translation cache, a fracturing operation may be employed by the control circuitry in order to allocate two or more entries within the address translation cache to hold coalesced address translation data.

Whilst it is determined at step 360 that the trigger condition has not yet been met, the process will return to step 320, in order to cause a next iteration through steps 320 to 360 to take place.

Once the trigger condition is determined to be met, the process proceeds to step 365 where the prefetch circuitry causes the control circuitry to seek to allocate an entry within the address translation cache for coalesced address translation data that is derived from the current state of the candidate coalesced address translation data within the entry of the buffer 38.

It will be appreciated that if the trigger condition was caused due to the prefetch circuitry determining that the coalescing criteria was no longer being met, the control circuitry will need to determine whether the candidate coalesced address translation data relates to a page size large enough to allow allocation of coalesced address translation data into the address translation cache, having regard to the supported page sizes within the address translation cache. However, assuming that criteria is met, then at least one item of coalesced address translation data can then be allocated into the address translation cache. As discussed earlier, if the current form of the candidate coalesced address translation data relates to a page size larger than the supported page size(s) of the coalesced address translation data within the address translation cache, then a fracturing operation can be performed in order to produce the required coalesced address translation data to be stored within the entry of the address translation cache.

When the determined address translation data is then allocated into the selected entry of the address translation cache, the entry type field 225 can be set for that entry to identify that the entry contains coalesced address translation data.

Once the allocation process has been performed at step 365, then the buffer entry can be invalidated at step 370.

Figure 6:
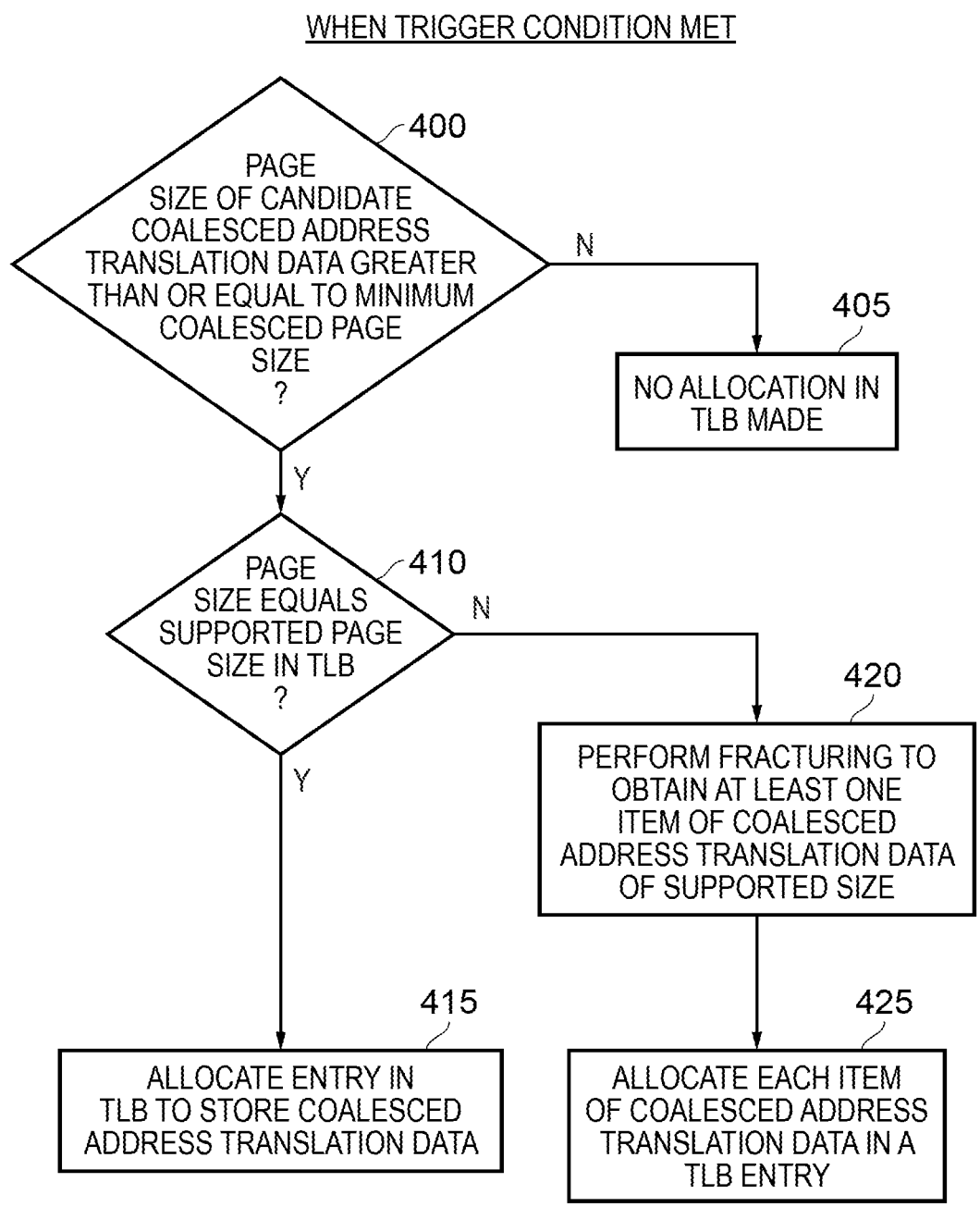
FIG. 6 is a flow diagram illustrating steps that may be performed in one example arrangement upon detection of a trigger condition, in order to determine appropriate coalesced address translation data to be allocated into the address translation cache.

FIG. 6 is a flow diagram illustrating the steps performed by the control circuitry after the trigger condition has been determined to be met at step 360 of FIG. 5B. At step 400, it is determined whether the page size of the candidate coalesced address translation data is greater than or equal to a minimum coalesced page size supported within the address translation cache. If not, then the process proceeds to step 405 where no allocation is made into the address translation cache.

However, assuming the test at step 400 is met, then at step 410 it is determined whether the page size of the candidate coalesced address translation data equals a supported page size in the address translation cache. If so, the process can merely proceed to step 415, where an entry is allocated within the address translation cache to store the coalesced address translation data, in that case the coalesced address translation data being formed directly from the candidate coalesced address translation data.

However, if the current page size of the candidate coalesced address translation data is not a supported page size, then the process proceeds to step 420 where a fracturing operation is performed by the control circuitry in order to obtain at least one item of coalesced address translation data of a supported page size, and then at step 425 each determined item of coalesced address translation data is then allocated into an entry of the address translation cache.

Figure 7:
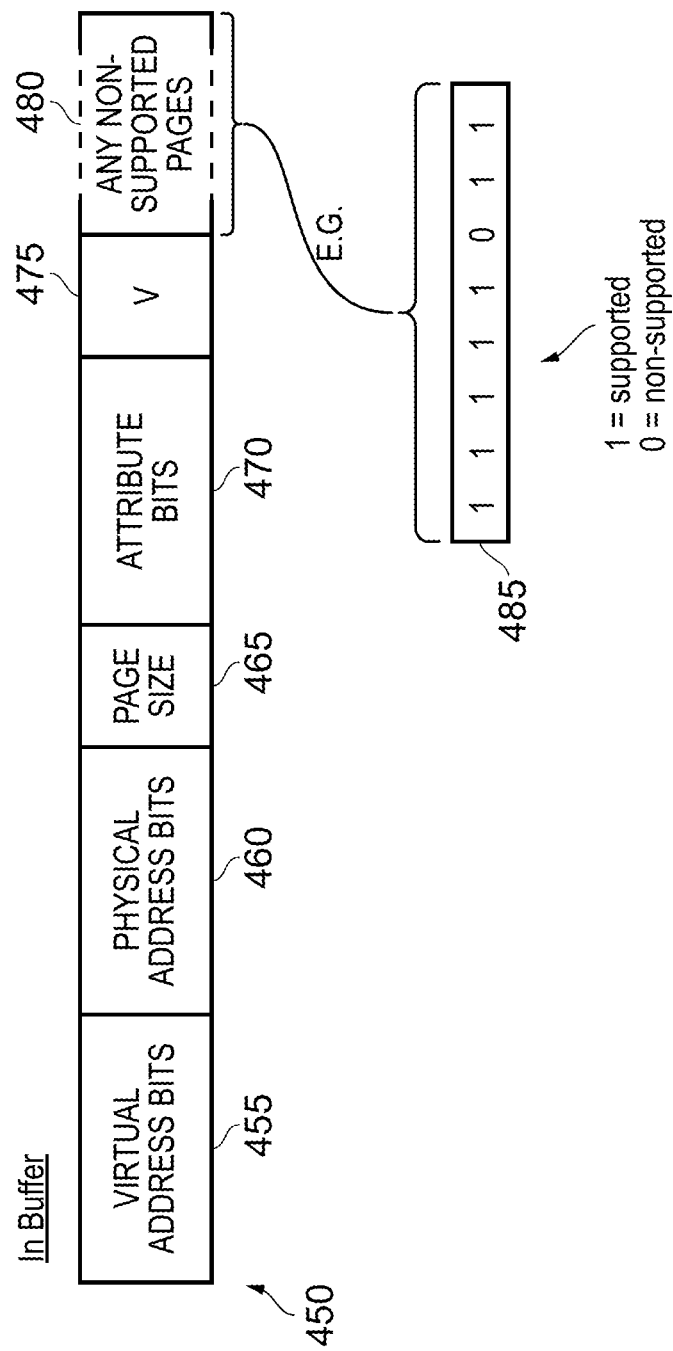
FIG. 7 schematically illustrates information that may be maintained in respect of each entry within the buffer used by the prefetch circuitry when producing candidate coalesced address translation data.

FIG. 7 illustrates fields that may be provided within the entry of the buffer 38 in relation to the candidate coalesced address translation data. In the same way as discussed earlier with reference to FIG. 4 for the entries in the address translation cache, the buffer entry 450 may maintain a field 455 for storing virtual address bits, a field 460 for storing corresponding physical address bits, a field 465 for indicating the current page size associated with the candidate coalesced address translation data, and a field 470 for storing the attribute bits. A valid field 475 can also be used to identify that the entry is valid.

As discussed earlier, in one example arrangement it is possible that the prefetch circuitry can overlook one or more individual descriptors not meeting the coalescing criteria, whilst still allowing the prefetch circuitry to continue to expand the number of contiguous virtual pages covered by the coalesced address translation data. In that event, an optional field 480 can be added to contain information to identify any non-supported pages, i.e. any pages for which the coalesced address translation data should not be used. This information can be represented in a variety of ways, but as one example field 485 can be provided, where a bit is used to identify for each page whether the candidate coalesced address translation data covers that page or not. It will be appreciated that in effect field 485 provides a valid bit for each page, and in that event the separate valid field 475 would not be required. In such an example arrangement, each buffer entry may only be able to support up to a certain maximum number of pages equal to the number of valid bits provided within the field 485.

As discussed earlier, there are a number of reasons as to why one or more pages may be non-supported. In particular, such pages may not meet the page alignment criteria and/or may not meet the attribute match criteria used to assess whether the coalescing criteria has been met.

In one example arrangement, strict matching of the attributes in respect of all of the descriptors is required in order for the coalescing criteria to be met. However, in an alternative configuration, it may be possible to allow some relaxation in the attribute match criteria, so that the pages covered by the candidate coalesced address translation data may have different values for a subset of the attributes whilst still determining that the attribute match criteria is met. A particular example of such a configuration will now be discussed with reference to FIGS. 8A and 8B.

Figure 8A:
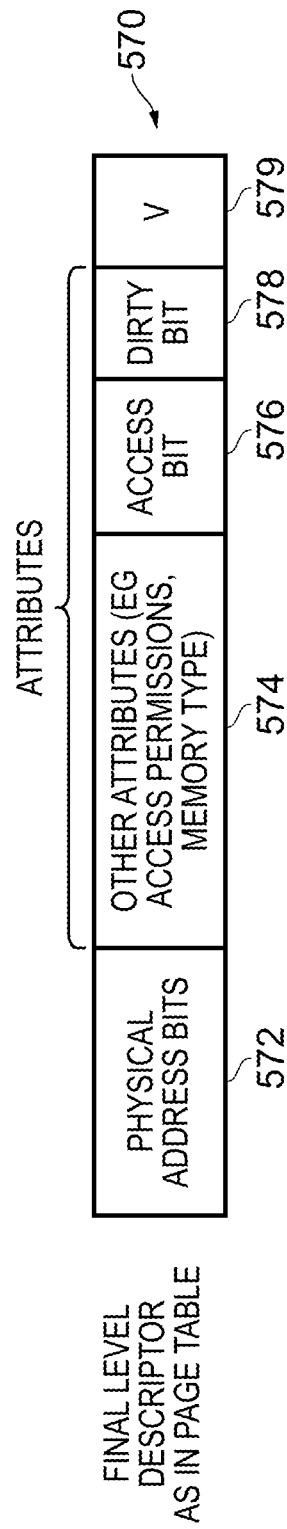
FIG. 8A illustrates fields that may be provided within a final level descriptor stored within a page table in accordance with one example arrangement.

FIG. 8A schematically illustrates fields that may be provided within a final level descriptor of a page table. In particular, a final level descriptor 570 may include a field 572 providing physical address bits, and one or more fields providing a number of attributes. The attributes can take a variety of forms, and as shown by the block 574 may include access permissions, and memory type information, such as whether the associated page relates to a writeback region of memory, a non-cacheable region, etc. In addition, an access bit 576 can be provided to identify whether the associated physical page in memory has been accessed, and a dirty bit 578 can be provided to identify whether the associated physical page contains dirty data, i.e. data that is more up to date than the copy held in non-volatile memory, e.g. a hard disk. In addition, a valid bit 579 can be provided to identify whether the descriptor is valid or nor. If an invalid descriptor is encountered during a page table walk process, then this will typically result in a page fault being raised.

As mentioned earlier, in order to add the address translation information from a retrieved descriptor into the candidate coalesced address translation data being maintained in the buffer, it is necessary for the attribute match criteria to be met. However, in accordance with the example to be discussed with reference to FIG. 8B, the attribute match criteria allows the plurality of descriptors to have different values for a first subset of the attributes. In particular, in accordance with this example, the access and dirty bits are allowed to differ, hence increasing the number of situations where it can be determined that a coalesced entry can be created. In particular, in the example described hereafter, these different access and dirty bits may be represented by descriptor specific valid and dirty bits provided within the entry in the buffer used to maintain candidate coalesced address translation data.

Figure 8B:
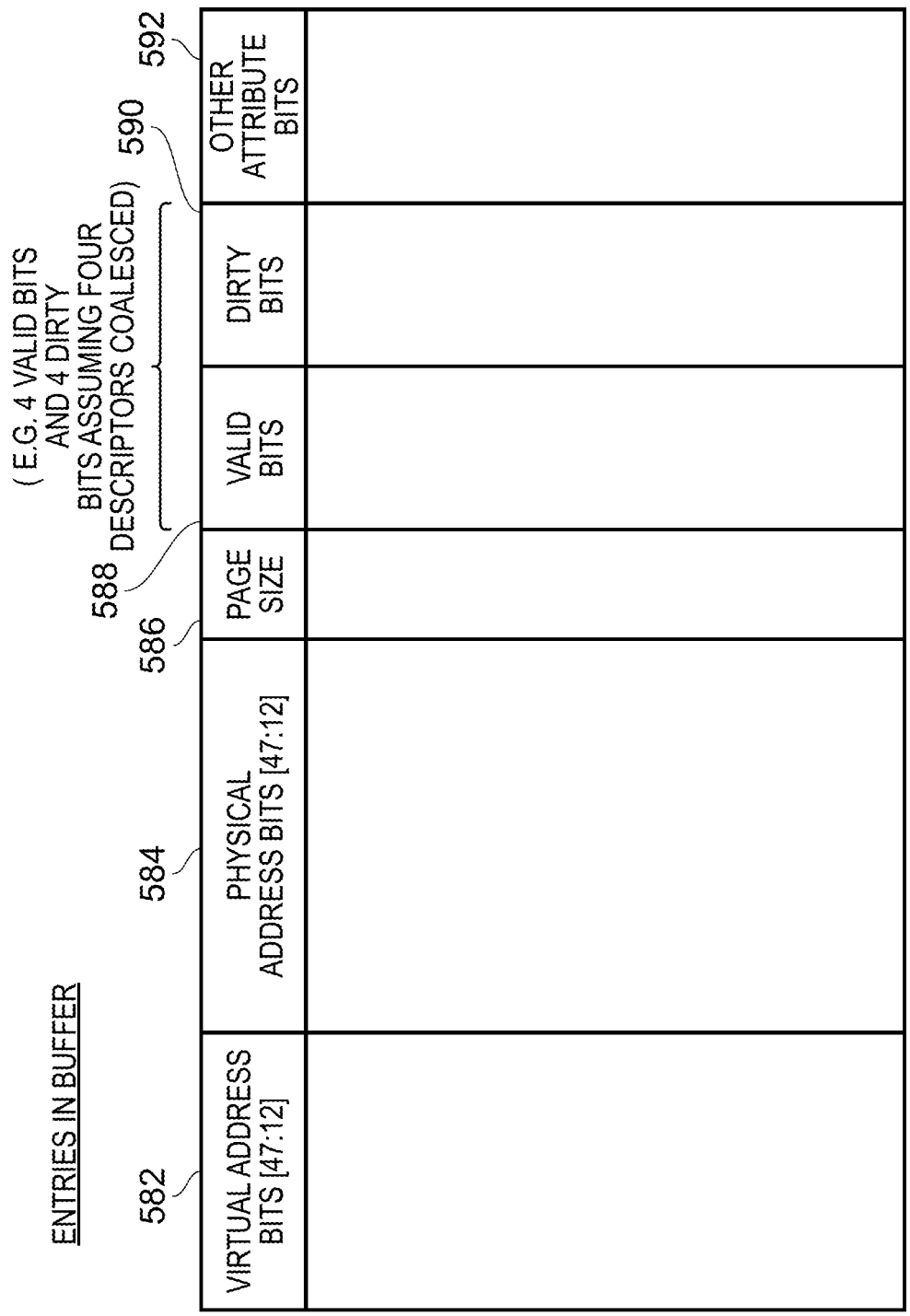
FIG. 8B is a diagram schematically illustrating fields that may be provided within each entry of the address translation cache in accordance with one example arrangement, where a relaxation in the attribute match criteria is supported.

FIG. 8B schematically illustrates the fields that may be provided within an entry of the buffer 38 used to maintain the candidate coalesced address translation data. A field 582 contains a sequence of virtual address bits. Considering the earlier example of FIG. 3 using a 48-bit virtual address, bits 47 to 12 of the virtual address may be stored within the field 582. Field 584 then stores the corresponding physical address bits for those virtual address bits. The page size 586 is then provided to identify the size of the physical page covered by the current form of the candidate coalesced address translation data.

The attribute bits other than the access and dirty bits that are common amongst all of the descriptors being coalesced may be stored within the other attributes field 592. As also shown in FIG. 8B, a series of valid bits 588 and a series of dirty bits 590 are also provided, for each of the pages that has been coalesced within the coalesced address translation data.

The individual dirty bits within the dirty bit field 590 take their values from the dirty bits provided from the corresponding descriptors, whilst the individual valid bits have their values determined by the value of the access bits associated with those descriptors.

When the entries in the buffer are established in the manner illustrated in FIG. 8B, then that format may also be adopted within the address translation cache when coalesced address translation data is allocated into an entry of the address translation cache. In particular, the various individual valid and dirty bits may be maintained within the translation cache entry when the coalesced address translation data is allocated into it.

More details as to the use of coalesced address translation data that uses multiple valid and dirty bits as per the format discussed above are set out in commonly owned, copending, U.S. patent application Ser. No. 15/290,039, the entire contents of which are hereby incorporated by reference.

From the above described examples, it will be appreciated that the described techniques allow candidate coalesced address translation data to be speculatively formed by prefetch circuitry following detection of a contiguous access condition in relation to the access requests being received from a request source such as a processor core. Whilst the prefetch circuitry is seeking to establish such coalesced address translation data, the address translation circuitry can continue to service live requests from the processor core in the usual way, such that the actions of the prefetch circuitry when seeking to establish candidate coalesced address translation data have no impact on the latency of the handling of the live requests from the processor core. Upon a trigger condition, coalesced address translation data can then be allocated into the address translation cache, whereafter subsequent access requests issued by the processor core relating to addresses covered by the coalesced address translation data may then result in a hit within the address translation cache. The described techniques provide a particularly efficient mechanism for establishing coalesced address translation data to be allocated within an address translation cache such as a TLB.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
an address translation cache having a plurality of entries, each entry to store address translation data used when converting a virtual address into a corresponding physical address of a memory system;
control circuitry to perform an allocation process to determine the address translation data to be stored in each entry;
an interface to receive access requests from a request source, each access request identifying a virtual address; and
prefetch circuitry, responsive to a contiguous access condition being detected from the access requests received by the interface, to retrieve one or more descriptors from a page table, where each descriptor is associated with a virtual page, in order to produce candidate coalesced address translation data relating to multiple contiguous virtual pages, and to trigger the control circuitry to allocate into a selected entry of the address translation cache coalesced address translation data derived from the candidate coalesced address translation data;
wherein:
the prefetch circuitry has associated buffer storage in which a buffer entry is allocated to maintain the candidate coalesced address translation data, and the prefetch circuitry is arranged in response to detection of the contiguous access condition:
to determine for each retrieved descriptor, with reference to the candidate coalesced address translation data, whether coalescing criteria are met by that retrieved descriptor, and in the presence of said coalescing criteria being met, to use that descriptor to update the candidate coalesced address translation data maintained in the buffer entry; and
on a trigger condition, to cause the control circuitry to perform the allocation process to store in the selected entry of the address translation cache the coalesced address translation data derived from the candidate coalesced address translation data maintained in the buffer entry.

2. An apparatus as claimed in claim 1, wherein:
the contiguous access condition is detected when a plurality of access requests received at the interface specify virtual addresses within contiguous virtual pages.

3. An apparatus as claimed in claim 2, wherein the prefetch circuitry is arranged to retrieve the one or more descriptors with the aim that the multiple contiguous virtual pages to which the candidate coalesced address translation data relates include one or more additional virtual pages beyond the contiguous virtual pages that resulted in the contiguous access condition being detected.

4. An apparatus as claimed in claim 1, wherein each descriptor is associated with a physical page in the memory system, and the candidate coalesced address translation data relates to multiple contiguous virtual pages that map to multiple physical pages within the memory system that meet specified page alignment criteria.

5. An apparatus as claimed in claim 1, wherein the coalesced address translation data allocated by the control circuitry into the selected entry of the address translation cache is set equal to the candidate coalesced address translation data.

6. An apparatus as claimed in claim 1, wherein:
the address translation cache has one or more supported page sizes for coalesced address translation data within the address translation cache; and
the control circuitry is responsive to the candidate coalesced address translation data exceeding a supported page size, to perform a fracturing operation in order to derive the coalesced address translation data to be allocated into the address translation cache.

7. An apparatus as claimed in claim 1, wherein the trigger condition comprises at least one of:
the candidate coalesced address translation data relating to a determined maximum number of multiple contiguous virtual pages;
the candidate coalesced address translation data relating to a maximum supported page size for coalesced address translation data within the address translation cache;
the coalescing criteria no longer being met.

8. An apparatus as claimed in claim 1, wherein:
each descriptor is associated with a physical page in the memory system; and
the prefetch circuitry is arranged to allow the coalescing criteria to be absent for one or more retrieved descriptors whilst continuing to retrieve further descriptors with the aim of updating the candidate coalesced address translation data maintained in the buffer entry prior to the trigger condition occurring; and
the candidate coalesced address translation data is arranged to identify any pages for which the candidate coalesced address translation data should not be used.

9. An apparatus as claimed in claim 1, wherein the prefetch circuitry is arranged to determine an initial form of the candidate coalesced address translation data from any address translation data detected to be present in the address translation cache for one or more of the access requests received at the interface that caused the contiguous access condition to be detected.

10. An apparatus as claimed in claim 1, wherein the prefetch circuitry is arranged to perform a series of page table walk operations in order to retrieve the one or more descriptors from the page table, each page table walk operation causing at least one descriptor to be obtained from the page table.

11. An apparatus as claimed in claim 10, wherein for each page table walk operation the prefetch circuitry is arranged:
to determine a virtual address to be issued in order to retrieve said at least one descriptor; and
to perform a lookup in the address translation cache using the virtual address to determine whether address translation data associated with the virtual address is already present within the address translation cache, and if so to use the address translation data accessed from the address translation cache rather than seeking to retrieve from the page table the descriptor associated with the virtual page identified by the virtual address.

12. An apparatus as claimed in claim 1, wherein:
each descriptor is associated with a physical page in the memory system, and the candidate coalesced address translation data relates to multiple contiguous virtual pages that map to multiple physical pages within the memory system that meet specified page alignment criteria; and
the prefetch circuitry is arranged to determine whether the coalescing criteria is met by determining whether updating the candidate coalesced address translation data to cover the physical page associated with the descriptor would allow the specified page alignment criteria to continue to be met.

13. An apparatus as claimed in claim 12, wherein said specified page alignment criteria requires the physical pages covered by the candidate coalesced address translation data to be contiguous physical pages.

14. An apparatus as claimed in claim 12, wherein:
each descriptor further comprises attribute data identifying a plurality of attributes; and
the candidate coalesced address translation data covers physical pages for which attribute match criteria is met;
the prefetch circuitry is arranged to determine whether the coalescing criteria is met by further determining whether updating the candidate coalesced address translation data to cover the physical page associated with the descriptor would allow the attribute match criteria to continue to be met.

15. An apparatus as claimed in claim 14, wherein the attribute match criteria allows the plurality of physical pages covered by the candidate coalesced address translation data to have different values for a first subset of the attributes when determining that the attribute match criteria is met.

16. An apparatus as claimed in claim 1, wherein the descriptors used to produce the candidate coalesced address translation data are final level descriptors.

17. An apparatus as claimed in claim 1, wherein when a request is received at the interface from the request source, a lookup operation is performed in both the address translation cache and the buffer storage in order to determine if there is a hit condition.

18. An apparatus comprising:
an address translation cache having a plurality of entries, each entry to store address translation data used when converting a virtual address into a corresponding physical address of a memory system;
control circuitry to perform an allocation process to determine the address translation data to be stored in each entry;
an interface to receive access requests from a request source, each access request identifying a virtual address; and
prefetch circuitry, responsive to a contiguous access condition being detected from the access requests received by the interface, to retrieve one or more descriptors from a page table, where each descriptor is associated with a virtual page, in order to produce candidate coalesced address translation data relating to multiple contiguous virtual pages, and to trigger the control circuitry to allocate into a selected entry of the address translation cache coalesced address translation data derived from the candidate coalesced address translation data,
wherein the apparatus is arranged to continue to process access requests from the request source, in parallel with the operation of the prefetch circuitry in the presence of the contiguous access condition.

19. A method of determining address translation data to be stored within an address translation cache having a plurality of entries, each entry for storing address translation data used when converting a virtual address into a corresponding physical address of a memory system, the method comprising:
- performing an allocation process to determine the address translation data to be stored in each entry;
- receiving access requests from a request source, each access request identifying a virtual address;
- responsive to a contiguous access condition being detected from the received access requests, employing prefetch circuitry to retrieve one or more descriptors from a page table, where each descriptor is associated with a virtual page, in order to produce candidate coalesced address translation data relating to multiple contiguous virtual pages; and
- triggering the allocation process to cause the allocation into a selected entry of the address translation cache of coalesced address translation data derived from the candidate coalesced address translation data;

wherein the prefetch circuitry has associated buffer storage in which a buffer entry is allocated to maintain the candidate coalesced address translation data, and in response to detection of the contiguous access condition, the prefetch circuitry:
- determines for each retrieved descriptor, with reference to the candidate coalesced address translation data, whether coalescing criteria are met by that retrieved descriptor, and in the presence of said coalescing criteria being met, uses that descriptor to update the candidate coalesced address translation data maintained in the buffer entry; and
- on a trigger condition, causes the allocation process to store in the selected entry of the address translation cache the coalesced address translation data derived from the candidate coalesced address translation data maintained in the buffer entry.

* * * * *